United States Patent [19]

Diaco et al.

[11] Patent Number: 4,958,876
[45] Date of Patent: Sep. 25, 1990

[54] VEHICLE CARGO BED LINER

[76] Inventors: Joseph Diaco, 16 Holden Rd., Cherry Hill, N.J.; Todd R. Kennedy, Box 486, Hanover, Pa. 17331

[21] Appl. No.: 492,904

[22] Filed: Mar. 13, 1990

Related U.S. Application Data

[63] Continuation-in-part of Ser. No. 312,571, Feb. 21, 1989, and a continuation-in-part of Ser. No. 237,049, Aug. 29, 1988, abandoned.

[51] Int. Cl.⁵ ............................................. B62D 33/00
[52] U.S. Cl. ................................... 296/39.2; 410/144
[58] Field of Search .................... 296/39.2, 39.1, 37.6; 224/42.42 R; 410/144

[56] References Cited

U.S. PATENT DOCUMENTS

| | | | |
|---|---|---|---|
| Re. 32,198 | 7/1986 | Wayne | 296/39.2 |
| D. 271,009 | 10/1983 | Fishler | D12/98 |
| 2,791,463 | 5/1957 | Levitt | 296/181 |
| 4,047,749 | 9/1977 | Lambitz et al. | 296/39.2 |
| 4,674,665 | 6/1987 | Van Kirk | 296/37.6 |
| 4,750,776 | 6/1988 | Barben | 296/39.2 |
| 4,767,149 | 8/1988 | Rye | 296/39.2 |
| 4,768,822 | 9/1988 | Gower | 296/39.2 |
| 4,887,947 | 12/1989 | Bott | 296/39.2 |

Primary Examiner—Robert R. Song
Attorney, Agent, or Firm—Clifford A. Poff

[57] ABSTRACT

A protective liner for a vehicle cargo bed wherein all surfaces of the liner which may be subject to significant impact from cargo striking thereagainst have formed thereupon a plurality of protective ridge members. Opposite sidewall portions of the liner have starkly protruding, vertically extending ribs of a depth sufficient to form load locks for the ends of elongated structure which is positionable across the width of the liner for preventing fore-and-aft movement of cargo placed in the liner. A storage container having ridge members formed on outer surfaces thereof may also be engaged with the load locks in an interfitting and interlocking relationship, to thereby support and affix the storage container against movement in the vehicle cargo bed.

44 Claims, 7 Drawing Sheets

VEHICLE CARGO BED LINER

CROSS REFERENCES TO RELATED APPLICATIONS

The instant application is a continuation-in-part of copending U.S. patent application Ser. No. 312,571, filed Feb. 21, 1989, now pending, entitled TRUCK BED LINER and U.S. patent application Ser. No. 237,049, filed Aug. 29, 1988, now abandoned, also entitled TRUCK BED LINER.

BACKGROUND OF THE INVENTION

1. Field of the Invention

The present invention relates generally to truck bed liners, and, more particularly, to a protective truck bed liner which allows a structure positioned in a truck cargo bed to be affixed in position in the truck cargo bed to be supported thereby.

2. Description of the Prior Art

Pick-up trucks, long utilized as working vehicles, have, in recent years, become accepted for use as family cars. Pick-up trucks have also, of recent years, gained popularity as sport vehicles. Because of the multiple uses of a pick-up truck, attempts have been made to adapt the same pick-up truck to allow usage as a working vehicle in some instances, and a family car in other instances.

When the pick-up truck is utilized as a working vehicle, the aesthetic appearance of the pick-up truck is of little concern to the user. However, when the same pick-up truck is to be utilized as a family car, or as a sport vehicle, the aesthetic appearance of the pick-up truck is of substantial importance.

Many attempts to adapt the vehicle for dual usage provide some sort of protective layer or liner positioned in the cargo area of the pick-up truck to prevent the cargo area floor and walls from scratches, chips, and dents resulting from haulage of cargo in the truck cargo bed. When so desired, the protective liner may be easily removed from the cargo bed. Numerous truck liners are known in the art including Nix et al. U.S. Pat. No. 4,181,349, Nix U.S. Pat. No. 3,881,768, Nix et al. U.S. Pat. No. 4,336,963, Richardson III U.S. Pat. No. 4,162,098, Ormiston U.S. Pat. No. 4,740,027, Wayne U.S. Pat. No. 4,341,412, Nix et al. U.S. Pat. No. 4,111,481, Carter U S. Pat. No. 4,245,863, Lorenzen, Jr. U.S. Pat. No. 3,814,473, Wagner U.S. Pat. No. 4,540,214, and Dresen, et al. U.S. Pat. No. 4,592,583. Each of the aforementioned patents disclose truck bed liners and/or protective inserts for the truck bed of a pick-up truck.

One disadvantage of a pick-up truck is the lack of storage space in the cab area of the pick-up truck. As a result, portable storage containers are placed in the cargo area of the pick-up truck for allowing the storage therewithin of material. For instance, quite frequently, tool chests are mounted in the cargo area of the pick-up truck to allow the storage therewithin of tools. However, the storage container must be securely attached to the pick-up truck. Otherwise, the storage container may slide about the cargo bed. This oftentimes necessitates the drilling of holes into the sidewalls and/or frontwalls of the truck cargo bed. In the event that a protective liner is also positioned in the truck cargo bed, bores must also be drilled through the truck bed liner to allow the storage container to be securely affixed to the pick-up truck. Such action makes removal of the truck bed liner from the truck cargo area more difficult and burdensome. Portability is a significant feature of many of the aforementioned prior art truck bed liners. Attachment of storage container to the pick-up truck therefore greatly lessens the usefulness of many of the prior art truck bed liners.

It is therefore an object of the present invention to provide a truck bed liner for a pick-up truck which allows a structure to be supported therein, but easily removable therefrom.

It is a further object of the invention to provide a high-strength liner for a cargo bed of a vehicle which protects all surfaces for the cargo bed from impact damage.

It is still a further object liner for a cargo bed of a vehicle which allows structures as simple as a length of wood and as sophisticated as a molded storage container to be firmly supported therein, but easily removable therefrom.

It is a further object of the invention to provide a vehicle cargo bed liner which allows cargo placed in the cargo bed to be secured against movement while situated in the cargo bed.

Still other objects and advantages of the present invention will become apparent in light of the attached drawings and description of the invention presented herebelow.

SUMMARY OF THE INVENTION

In accordance with the present invention, a protective liner for a truck cargo bed is disclosed. The protective liner allows a structure positioned in the cargo bed to be supported and affixed in position in the truck cargo bed. The protective liner includes a liner floor portion positioned upon a floor portion of the truck cargo bed floor, with the liner bottom portion having elevated portions formed thereupon to conform to wheel wells protruding from the truck cargo bed floor. Upwardly extending liner sidewall portions extend upwardly from opposite sides of the liner floor portion, with each of the liner sidewall portions being positioned against sidewall portions of the truck cargo bed. An upwardly extending liner frontwall portion extends upwardly from a front end portion of the liner floor portion, with the liner frontwall portion being positioned against a frontwall portion of the truck cargo bed. Means are formed on the upwardly extending liner sidewall portions and are adapted to engage with the structure positioned in the cargo bed to affix the structure to the liner sidewall portions, supporting the structure thereby.

In the preferred embodiment of the present invention, the means formed on the upwardly extending liner sidewall portions include a plurality of spaced apart, vertically extending ridge members protruding from the liner sidewall portions whereby gaps separating adjacent ones of the ridge members form load locks of a depth sufficient to anchor an end of the structure positioned in the truck cargo bed. Preferably, the load locks formed on opposite liner sidewall portions are situated to allow a first end of the structure to be anchored in a load lock formed on a first liner sidewall portion, and a second end of the structure to be anchored in a load lock formed on a second liner sidewall portion.

While the structure supported in the cargo bed may simply be a length of wood, in the preferred embodiment, the structure supported and affixed in the truck cargo bed is a storage container, such as a tool chest.

Preferably, the tool chest is of a length to span a width of the truck cargo bed such that opposite ends of the tool chest abut against the upwardly extending liner sidewall portions positioned against the opposite sidewalls of the truck cargo bed. The opposite ends of the tool chest may further include means adapted to engage with the liner sidewall portions in an interlocking relationship, and may include a plurality of spaced apart, vertically extending ridge members.

In a further embodiment of the present invention, the storage container further abuts against the upwardly extending liner frontwall portion, and the upwardly extending liner frontwall portion may further include a plurality of spaced apart, vertically extending ridge members protruding from the liner frontwall portions. The storage container may similarly have formed on the front side portion thereof a means adapted to engage with the liner frontwall portion in an interlocking relationship, and may include a plurality of vertically extending ridge members.

The cargo bed liner of the present invention further includes additional ribs or ridge members similar in structure to but generally of lesser depth than the aforementioned vertically extending ribs or ridge members, the additional ribs protruding from virtually all other portions of the bed liner in order to protect all surfaces of the cargo bed—including the front and side walls of the bed, the floor of the bed, the inner wall of the tailgate, and the front, rear, top, and side walls of the wheel wells protruding upwardly into the bed—which may be susceptible to impact damage from cargo striking thereagainst.

BRIEF DESCRIPTION OF THE DRAWINGS

The present invention will be better understood when read in light of the accompanying drawings in which.

DESCRIPTION OF THE PREFERRED EMBODIMENTS

Figure 1:
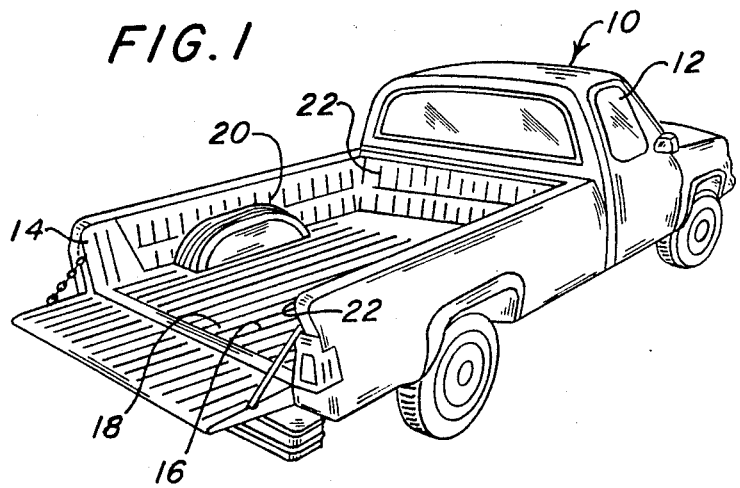
FIG. 1 is a perspective view of a pick-up truck having a first embodiment the truck bed liner of the present invention positioned in the cargo area thereof.

Referring first to the perspective illustration of FIG. 1, there is shown a pick-up truck 10 having a cab area 12 and a cargo bed area 14. The first embodiment of the truck bed liner 16 of the present invention is positioned within the cargo bed 14. While in the preferred embodiments, truck bed liner 16 or liner 116 to be described hereinbelow are comprised of a polyethylene material which is molded to form a single, integral unit, and the following detailed description of the liner 16 (or liner 116) will describe the present invention as such, it is to be understood that, alternatively, other materials of construction may be utilized to form liner 16 (or liner 116) of the present invention.

Figure 2:
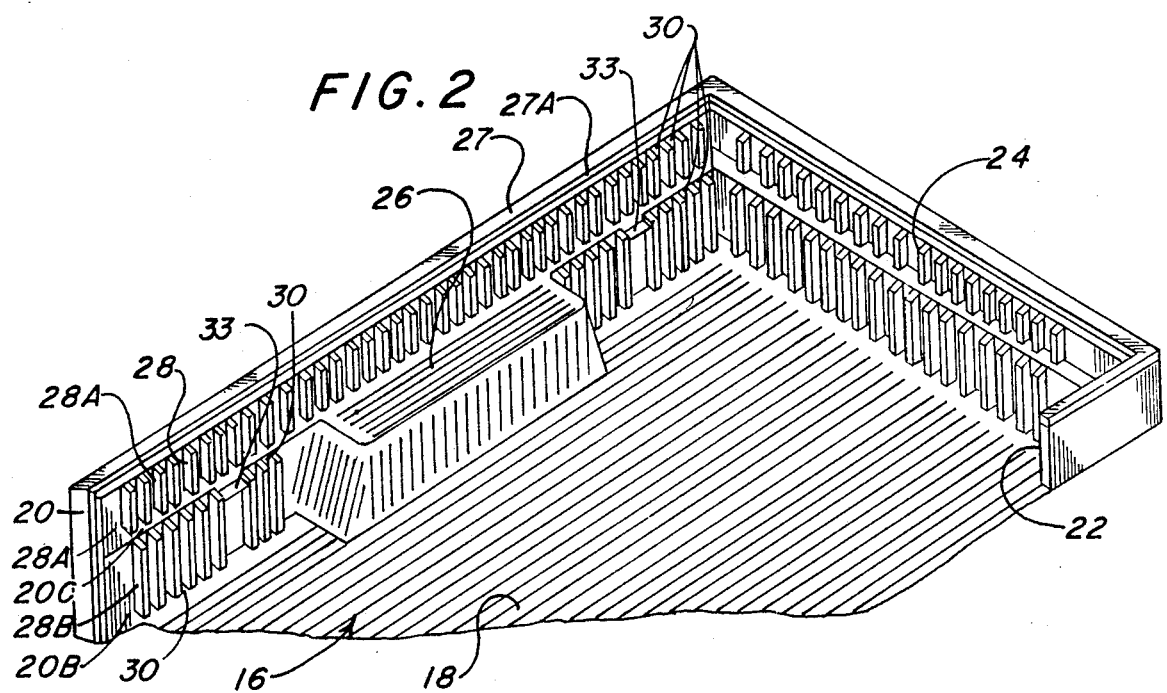
FIG. 2 is an enlarged partial, cut-away view of the first embodiment of the truck bed liner of the present invention depicted in FIG. 1.

Truck bed liner 16 of the first embodiment of the present invention is shown in greater detail in the cutaway view of FIG. 2. Truck bed liner 16 is shown to include liner floor portion 18, liner sidewall potions 20 and 22 (only a portion of portion 22 is illustrated in FIG. 2), and liner frontwall portion 24. Liner sidewall portions 20 and 22 are positioned to extend upwardly from opposite sides of liner floor portion 18, and liner frontwall portion 24 is positioned to extend upwardly from a front end of liner floor portion 18. Liner floor portion 18 further includes elevated portions 26 conforming to wheel wells protruding from the truck cargo bed floor. Formed as such, truck bed liner 16 substantially covers the entire cargo bed 14 of pick-up truck 10. Bed liner 16 thereby protects cargo bed 14 from damage due to use of the pick-up truck 10 as a work vehicle.

Formed on the surface of liner sidewall portions 20 and 22 are a plurality of spaced apart, vertically extending ridge members 28. While FIG. 2 illustrates the inner surface of liner sidewall portion 20, the inner exposed surface of liner sidewall portion 22 is identical. Sidewall portions 20 and 22 further contain rail overlay portions 27 containing notched parts 27A. While in the preferred embodiment, each ridge member 28 is comprised of a upper section 28A and an lower section 28B, for reasons to be discussed hereinbelow, in the simplest embodiment of the present invention, ridge members 28 need not be comprised of sections 28A and 28B. Similarly, liner frontwall portion 24 also contains a plurality of spaced apart, vertically extending ridge members 28.

Gaps formed between, and separating, adjacent ones of the ridge members 28 form load locks of a depth sufficient to anchor a structure to prevent longitudinal movement of the member in the cargo bed 14 of the pick-up 10. For example, a length of wood, such as a 2×4, may be positioned so that a first end thereof is positioned within a gap 30 between adjacent ridge members 28 formed on liner sidewall portion 20, and a second end of the length of the wood may be positioned to extend into a gap 30 separating two adjacent ridge members 28 formed on a surface of liner sidewall portion 22.

In the first embodiment of the truck bed liner 16 illustrated in FIG. 2, liner sidewall portion 20 is formed of two vertically extending parts 20A and 20B, and horizontally extending part 20C. This arrangement increases the structural strength of the sidewall 20, and also provides a horizontal surface upon which a bottom end portion of a structure, such as the end portion of the length of wood, may be supported. As illustrated in the embodiment of FIG. 2, horizontal part 20C is formed at an elevation above floor portion 18 to merge into the elevated portion 26. The horizontal part 20C and elevated portions 26 are convenient support sites for sheet-like cargo such as plywood. When so supported a sheet of plywood divides the cargo bed into upper and lower compartments which are above and below the plywood. Also illustrated in the first embodiment of the liner 16 are notches 30 formed by the gap between two ridge members 28. Notches 30 contain horizontal surfaces 33 and similarly function as load locks to anchor a support member such as a length of wood to prevent longitudinal movement along the truck cargo bed 14 and to provide additional support for sheet forms of cargo.

Figure 3A:
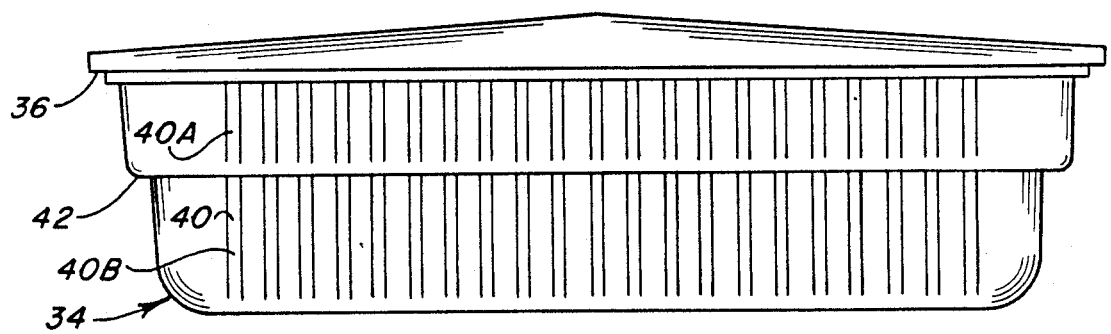
FIGS. 3A, 3B, and 3C are front, bottom, and end views, respectively, of a first embodiment of a storage container which may be removably affixed to the first embodiment of the truck bed liner of the present invention.
Figure 3B:
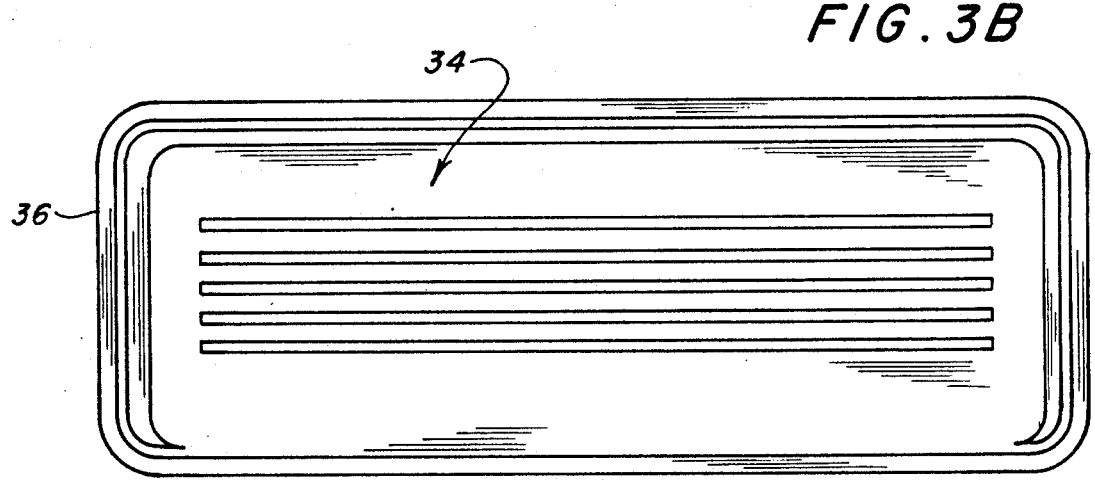
Figure 3C:
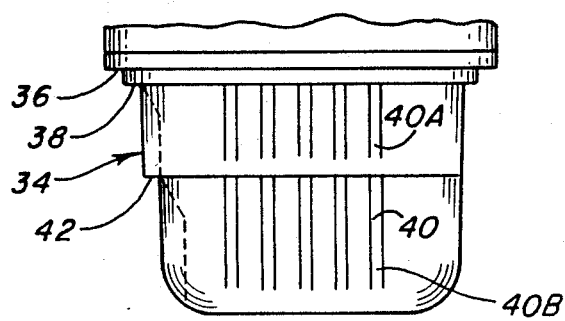

Turning now to the illustrations of FIGS. 3A-3C, there are shown side, overhead, and end views, respectively, of a first embodiment of a storage container 34 which may be affixed in position in the truck cargo bed by truck bed liner 16. Storage container 34 is preferably formed to provide shoulder portion 38 of dimensions allowing the end portions of shoulder portion 38 to rest upon notched part 27A of rail overlay 27.

Figure 4:
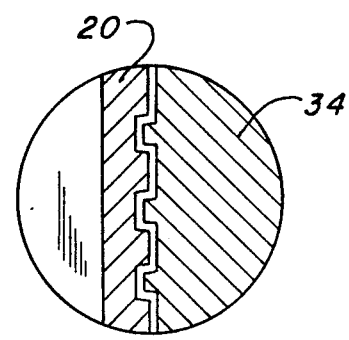
FIG. 4 is a detail view of the inter-fitting relationship between the storage container and protective liner of the present invention.

Similar to ridge members 28 formed on the inner surfaces of liner sidewall portions 20 and 22, and liner frontwall portion 24, storage container 34 also has formed on the outer surfaces thereof a plurality of spaced apart, vertically extending ridge members 40. Ridge members 40, again, are similarly preferably comprised of sections 40A and 40B, and the ends and frontwall of storage container 34 contain a horizontal step to allow positioning upon horizontal section 20C of the liner sidewall portion 20. This arrangement allows ridge members 40 on a front side of storage container 34 to engage with ridge members 28 formed on the surface of liner frontwall portion 24, and ridge members 40 positioned on the side surface of storage container 34 to engage with ridge members 28 formed on liner sidewall portions 20 and 22. When suitably positioned, ribs 40 formed on the storage container 34, and ridge members 28 formed on portions 20-24 of the liner, engage with one and other in an interfitting relationship thereby preventing movement of storage container 34. This relationship is illustrated in the detail view of FIG. 4. Furthermore, the downward load exerted by storage container 34 due to the weight thereof is distributed across shoulder portion 38, and step 42.

Figure 5:
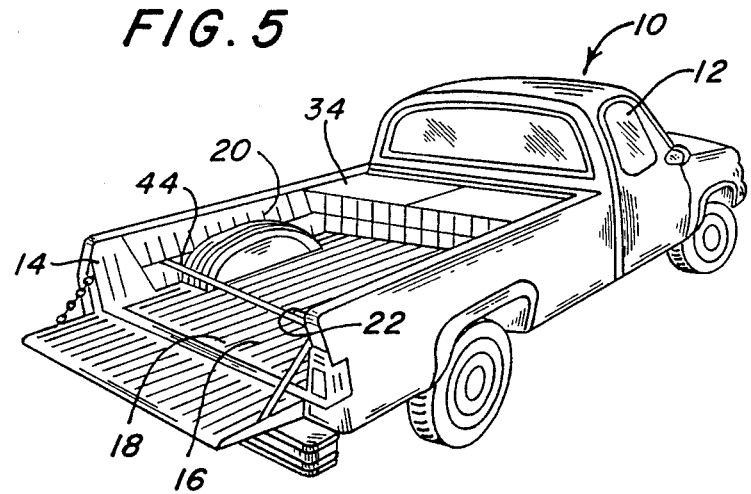
FIG. 5 is a perspective illustration of the present invention in which the storage container of FIG. 3 is supported in the truck bed liner of FIG. 2.

Referring to the perspective illustration of FIG. 5, there is shown pick-up truck 10 having truck bed liner 16 and storage container 34 of the first embodiments of the present invention positioned in the cargo bed area 14 thereof. The interlocking relationship between ridges 28 and 40 prevents movement of storage container 34. Also illustrated in FIG. 5 is a length of wood 44 having opposite ends thereof anchored in notches 30 to be supported thereby.

Figure 6:
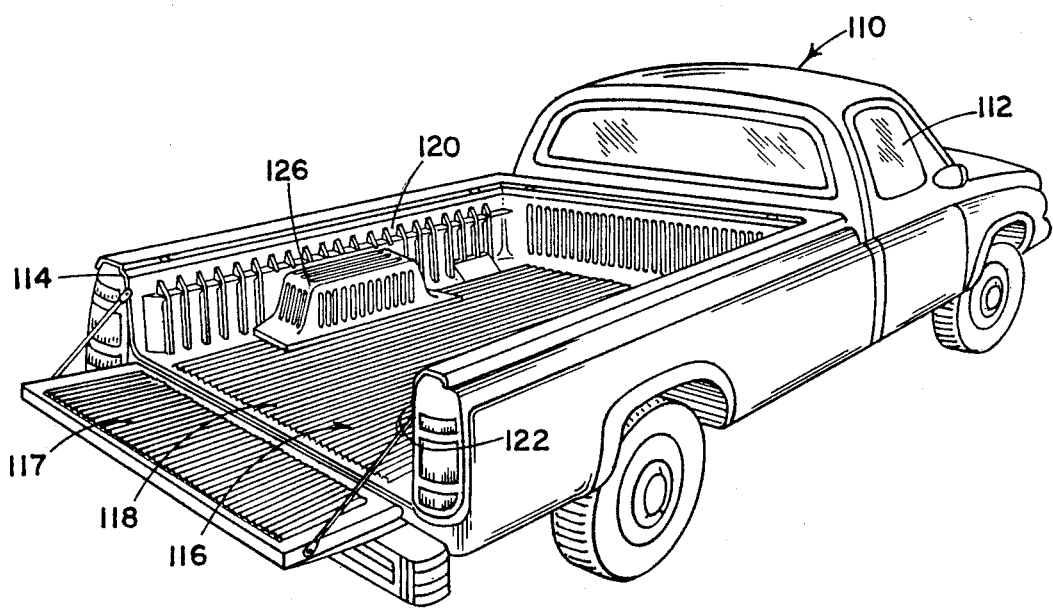
FIG. 6 is a perspective view of a pick-up truck having a protective vehicle bed liner in accordance with a second embodiment the present invention positioned in the cargo area thereof.

Referring now to the perspective illustration of the second embodiment of the present invention depicted in FIG. 6, there is shown a vehicle 110, such as a pick-up truck, for example, having a cab area 112 and a cargo bed area 114. The protective vehicle cargo bed liner 116 of the present invention positioned within the cargo bed 114 and is preferably used in conjunction with a ribbed tailgate liner 117.

Figure 7:
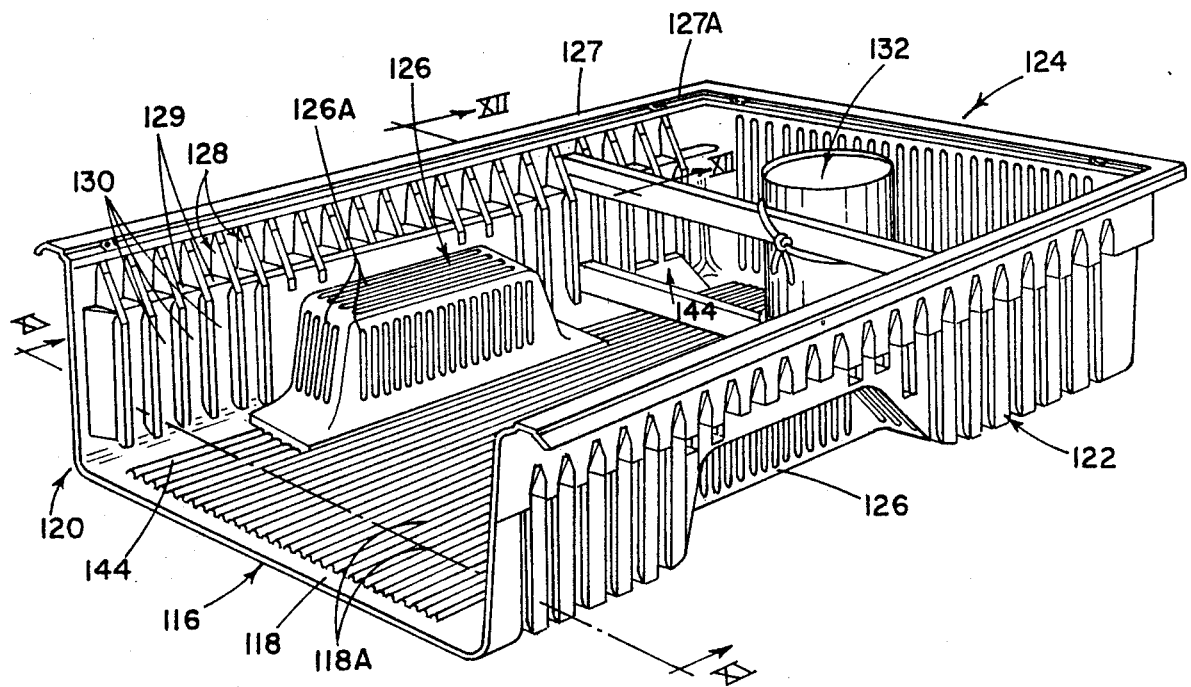
FIG. 7 is an enlarged perspective view of the second embodiment of the vehicle bed liner of the present invention illustrating the load locking features thereof.

The vehicle cargo bed liner 116 of the second embodiment of the present invention is shown in greater detail in FIG. 7. Bed liner 116 is shown to include ribbed liner floor portion 118, ribbed liner sidewall portions 120 and 122, and ribbed liner frontwall portion 124. Liner sidewall portions 120 and 122 are positioned to extend upwardly from opposite sides of liner floor portion 118, and liner frontwall portion 124 is positioned to extend upwardly from a front end of liner floor portion 118. Liner floor portion 118 further includes ribbed elevated portions 126 conforming to and accommodating wheel wells protruding from the vehicle cargo bed floor. Formed as such, bed liner 16 substantially covers the entire cargo bed 114 of vehicle 110 while tailgate liner 117 substantially covers the inner wall of the tailgate. Bed liner 116 and tailgate liner 117 thereby protect the cargo bed 114 and the tailgate from damage due to use of the pick-up truck 110 as a work vehicle.

Formed on the surface of liner sidewall portions 120 and 122 are a plurality of continuous, spaced apart, vertically extending ribs or ridge members 128. While FIG. 7 illustrates the inner surface of liner sidewall portion 120, the inner exposed surface of liner sidewall portion 122 is identical, as can be seen with reference to FIG. 11. At their upper edges, sidewall portions 120 and 122 and frontwall portion 124 are formed with flange-like cargo bed rail overlay portions 127 containing notched parts 127A. As with the first embodiment of the vehicle truck bed liner, it will be understood by one of ordinary skill in the art that, although not illustrated, the rail overlay portions 127 and notched parts 127A are omitted and the liner sidewall portions 120 and 122 and frontwall portion 124 are positioned under the rail of the vehicle cargo bed in such vehicle bed configurations requiring an "under-rail" orientation of the liner 116.

In accordance with the second embodiment of the present invention, the ridge members 128, except in the regions of elevated portions 126, are tiered or stepped and form upper sections 128A and lower sections 128B which are joined by a horizontal surface 129 formed in and extending for substantially the entire length of each sidewall portion 120 and 122, the horizontal surface 129 in this embodiment preferably being situated above the upper surface of the elevated portions 126. As with the horizontally extending part 20C of the first embodiment of the vehicle truck bed liner of the present invention, the inclusion of the step formed by horizontal surface 129 imparts high strength and rigidity to the sidewall portions 120 and 122 by increasing resistance to bending, compression, and other forces which may be applied thereto.

Gaps are formed between, and separate, adjacent ones of the ridge members 128 in sidewall portions 120 and 122. The gaps are formed between both the upper sections 128A and the lower sections 128B of ribs 128 and form load locks 130 of a "depth" sufficient to anchor a structure to prevent longitudinal or "fore-and-aft" movement of the structure in the cargo bed 114 of the pick-up 110, wherein the term "depth" corresponds substantially to the distance to which the ribs 128 outwardly protrude from the sidewall portions 120 and 122. In accordance with the present invention, an elongated rigid member such as a length of wood, e.g., a 2×4, herein designated by the numeral 131A in FIG. 11, may be positioned so that a first end thereof is positioned within a gap 130 between two upper sections 128A of adjacent ridge members 128 formed on liner sidewall portion 120 so as to rest upon horizontal surface 129 Accordingly, a second end of the length of wood 131A may be positioned to extend into a gap or load lock 130 separating two upper sections 128A of adjacent ridge members 128 formed on liner sidewall portion 122 so as to also rest upon horizontal surface 129, preferably in direct opposition to the gap 130 in sidewall portion 120 in which the first end of the length of wood 131A is received.

The particular gaps 130 into which the elongated structure such as the length of wood 131A are placed are dependent generally upon the overall dimensions and weight of the cargo which is to be prevented from fore-and-aft movement in the vehicle cargo bed. Consequently, in order to minimize fore-and-aft movement of the cargo within liner 116, the cargo should be placed as far forward in liner 116 as possible, preferably so that it contacts frontwall portion 124, and then an elongated structure, such as the length of wood 131A and/or a similar structure 131B, is placed in the next immediately rearwardly following opposed pair of gaps in sidewall portions 120 and 122 into which it/they are easily placed. It will be understood that although the elongated structures discussed thus far have been in reference to lengths of wood, other types of elongated members of other materials such as metals, plastics, and the like, may be suitably used in the construction of the present invention, if desired.

Figure 11:
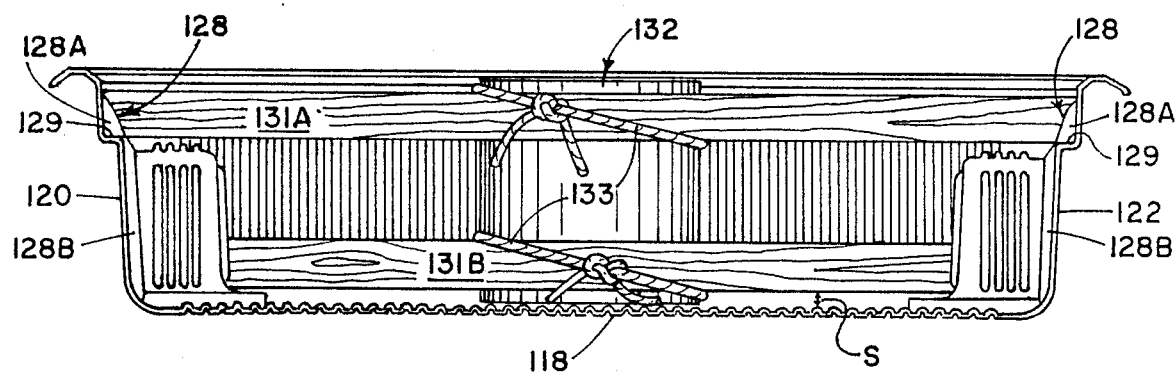
FIG. 11 is a sectional view of the second embodiment of the vehicle bed liner of the present invention taken along line XI—XI of FIG. 7.
Figures 12, 13:
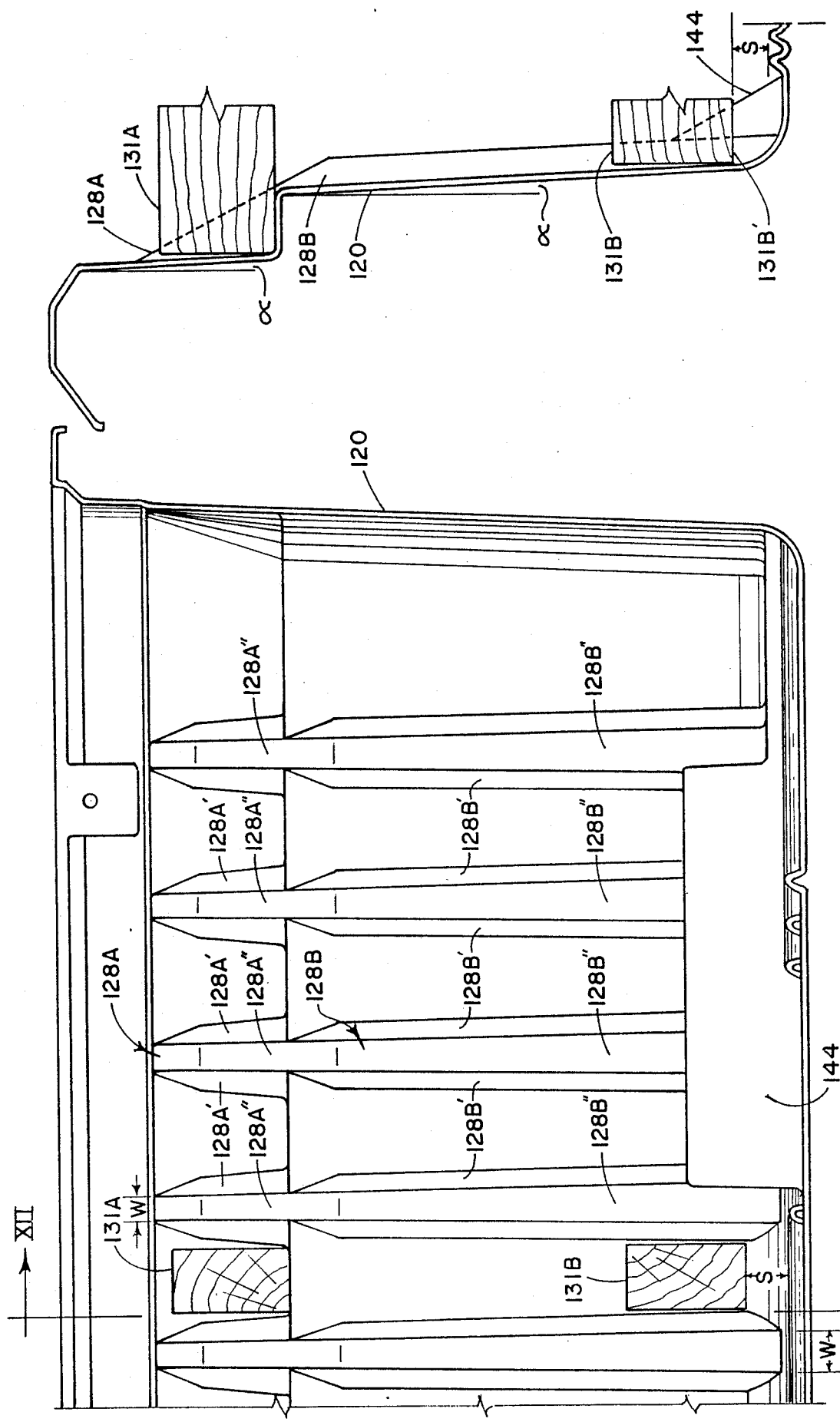
FIG. 12 is a partial sectional view of the second embodiment of the vehicle bed liner of the present invention taken along line XII—XII of FIG. 7.
FIG. 13 is an internal, partial sectional view of the second embodiment of the vehicle bed liner of the present invention.

As noted hereabove, an elongated structure 131B may be used by itself or in combination with structure 131A in order to prevent longitudinal or fore-and-aft movement of cargo in liner 116. As is most clearly seen in FIG. 11, structure 131B is somewhat shorter in length than structure 131A due to the opposed inwardly directed steps provided by the aforementioned horizontal surfaces 129 formed in sidewall portions 120 and 122. With reference to FIGS. 11 and 12 it is seen that, according to the preferred practices of the present invention, the lower elongated structure 131B is cut to a length no less than a predetermined minimum length such that the lower opposite end edges 131B' thereof, either with or without a preferred inward angling of sidewall portions 120 and 122 which will be described hereinbelow, preferably rest no lower in elevation within liner 116 than upon the upper portion of the downwardly and inwardly directed material which connects the lower edges of the liner sidewall portions 120 and 122 to the liner floor portion 118 whereby a space "S" is formed between the bottom of structure 131B and the top of the ribs 118A formed in floor portion 118 in order to promote drainage of the liner and to permit passage therethrough of an optional cargo lashing means to be described hereinbelow.

The internal, partial sectional view of the second embodiment of the vehicle bed liner 116 of the present invention depicted in FIG. 13 reveals that the side surfaces 128A' and 128B' of each of the upper and lower rib sections 128A and 128B, respectively, diverge from one another in the direction of the sidewall portions 120 and 122. As will be readily appreciated, these divergent surfaces 128A' and 128B' are formed, as are all of the surfaces of liner 116, by appropriately designed and configured molding surfaces provided on a suitable liner mold (not illustrated).

Moreover, it is preferred that, as illustrated in FIG. 13, the front surface 128A" and 128B" of each of the upper and lower rib sections 128A and 128B, respectively, gradually increase in width "W" from the top to the bottom of the respective rib section. Such a provision permits elongated structures of various widths to be effectively used in the vehicle cargo bed liner 116 of the present invention.

Reference to FIGS. 6,7,11 and 12 reveals the further provision of inwardly projecting means 144 formed into sidewall portion 120 for accommodating a vehicle fuel tank filler pipe (not illustrated). Although illustrated as being formed forward of the elevated portion 126 in sidewall portion 120, it will be appreciated that one or more fuel tank filler pipe accommodating means 144 may be suitably formed at virtually any location along sidewall portions 120 and/or 122 depending, of course, upon the location(s) of the fuel tank filler pipe(s) of the vehicle 110 From the magnified view of FIG. 12, it can be further seen that, from top to bottom, both the upper region and the lower region of sidewall portion 120 are preferably angled slightly inwardly from the vertical at an angle $\alpha$, preferably on the order of 2.5°. The same is true for sidewall portion 122. This inward angling of the sidewall portion 120 and 122, in combination with the formation of the divergent side surfaces 128A' and 128B' of the upper and lower rib sections 128A and 128B, respectively, serve to facilitate removal of the liner 116 from the mold in which it is formed. Equally as importantly, the angled sidewall portions 120 and 122 provide an individual with the luxury of a permissible range of latitude or "imprecision" in the preparation of suitable lengths of elongated structures 131A and/or 131B. Accordingly, with particular regard to elongated structure 131B, so long as the structure 131B is cut within reasonable accuracy, a space "S" is always maintained between it and ribs 118A by virtue of the contact of its opposite ends either with the inner wall surfaces of the inwardly angled load locks 130 formed between the lower sections 128B of sidewall portions 120 and 122 or with the downwardly and inwardly directed material which connects the lower edges of the liner sidewall portions 120 and 122 to the liner floor portion 118.

FIGS. 7 and 11 depict a single "upper" elongated structure 131A and a single "lower" elongated structure 131B used to prevent a barrel-shaped item of cargo 132 from longitudinal or fore-and-aft movement in the liner 116. It will be understood that, depending on the height, weight, shape, etc., of cargo item 132, two or more vertically stacked ones of structures 131A and/or 131B may be required to provide sufficient strength to positively prevent the cargo from fore-and-aft movement in the vehicle cargo bed liner 116. Moreover, one or more optional cargo lashing means 133 such as cord, chain, rope, cable, and the like, may be secured around cargo item 132 and any number of structures 131A and/or 131B in order to prevent lateral or "side-to-side" movement of cargo in the liner 116, particularly during turning of the vehicle 110.

As should now be appreciated, the unique combination of elements in accordance with the present invention comprising the liner sidewall portions 120 and 122 having the stepped ribs 128 including the gaps or load locks 130 formed therebetween, the elongated structure(s) 131A and/or 131B which are positioned in the load locks 130, and the optional cargo lashing means 133, provide a novel, high-strength system for positively preventing cargo placed in the vehicle cargo bed liner 116 from longitudinal and lateral movement during acceleration, deceleration, or turning of the vehicle 110.

Figure 8A:
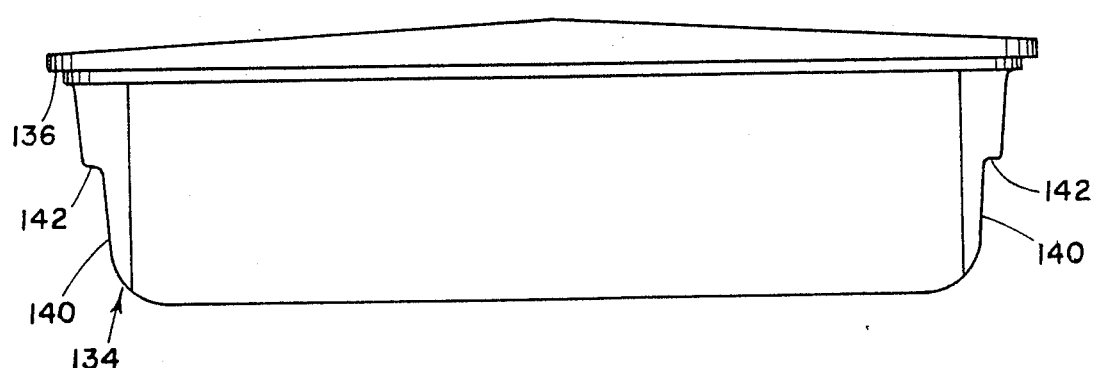
FIGS. 8A, 8B and 8C are front, bottom, and end views, respectively, of a second embodiment of a storage container which may be removably affixed to the second embodiment of the vehicle bed liner of the present invention.
Figure 8B:
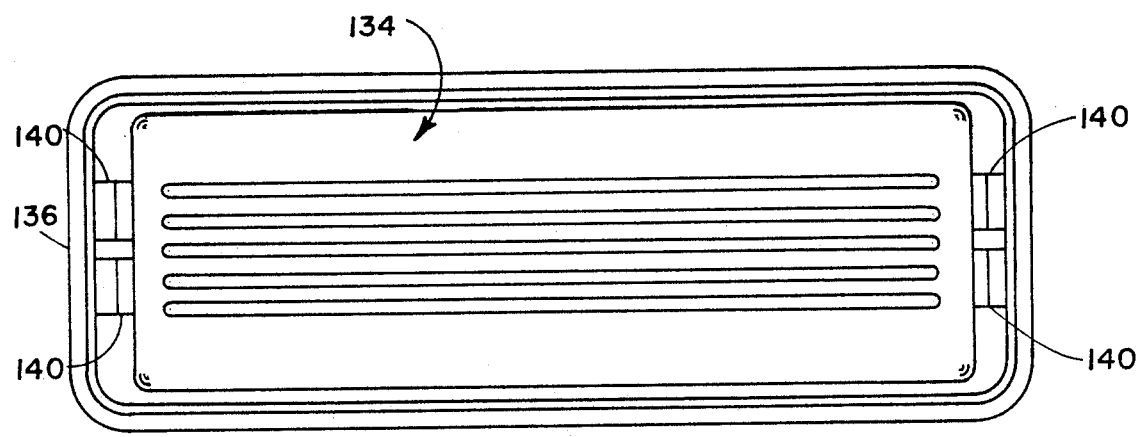
Figure 8C:
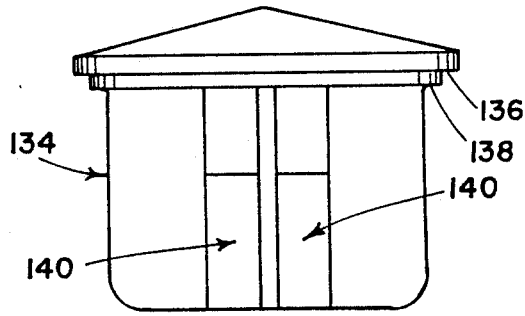

Turning to the illustrations of FIGS. 8A-8C, there are shown front side, bottom, and end views, respectively, of a storage container 134 which may be affixed in position in the truck cargo bed 114 by vehicle bed liner 116 Similar to the construction of storage container 34, storage container 134 is preferably formed to provide a shoulder portion 138 to rest upon notched parts 127A of rail overlay 127. Also, storage container 134 is preferably provided with an appropriately dimensioned cover 136.

Figure 9:
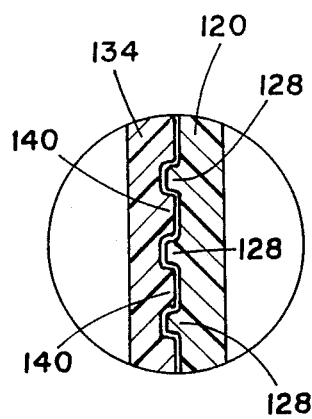
FIG. 9 is an enlarged sectional view of the interfitting relationship between the second embodiments of the storage container and protective liner of the present invention.
Figure 10:
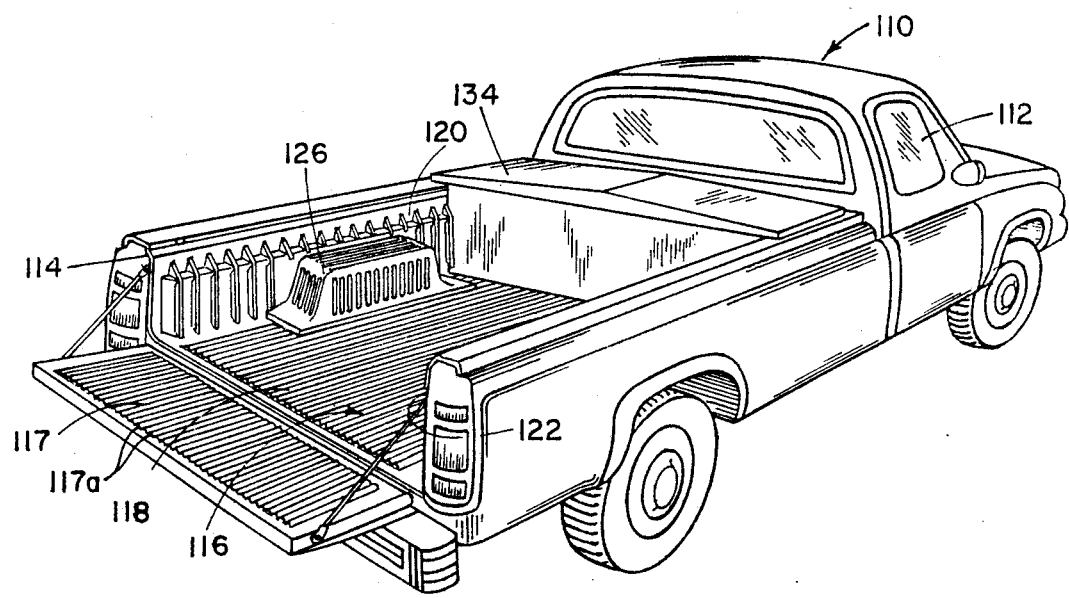
FIG. 10 is a perspective illustration of the second embodiment of the vehicle bed liner of the present invention in which the storage container of FIGS. 8A, 8B and 8C is supported therein.

Storage container 134 has formed on the outer end surfaces thereof a plurality of spaced apart, vertically extending ridge members or ribs 140 complementary in shape to the gaps or load locks 130 for spanning the gaps 130 and for interlocking with the ridge members or ribs 18 formed on the inner surfaces of liner sidewall portions 120 and 122. The ribs or ridge members 140 of storage container 34 are further formed with a horizontal surface 142 to allow positioning upon the horizontal surfaces 129 of the liner sidewall portions 120 and 122. While only two are shown on each end of the storage container 134, it will be appreciated that any suitable number of ridge members 140 may be provided on the ends of container 134 to be used with the truck bed liner 116. When suitably positioned, ribs 140 formed on the storage container 134, and ribs 128 formed on portions 120 and 122 of the liner, engage with one and other in an interfitting and mating relationship thereby preventing movement of storage container 134. This relationship is illustrated in the detail view of FIG. 9. Furthermore, the downward load exerted by storage container 134 due to its own weight and due to the weight of the contents thereof is distributed across shoulder portion 138, horizontal surface 142, and the bottom surface of the container. Referring the perspective illustration of FIG. 10, there is shown a pick-up truck 110 having the second embodiments of the vehicle bed liner 116 and storage container 134 of the present invention positioned in the cargo bed area 114 thereof. As noted above, the interlocking relationship between ridges 128 and 140 prevents movement of storage container 134.

In each of FIGS. 6,7,10 and 11, it can be seen that, by virtue of an assortment of protruding ridge members, the truck bed liner 116, along with tailgate liner 117, protects all of the surfaces of the vehicle cargo bed 114 which may be subject to impact damage from cargo striking thereagainst. The surfaces to be protected from impact damage include the sidewalls, frontwall and floor of the bed 114, the inner wall of the tailgate, and the front, rear, top and inner side portions of the protruding wheel wells. The plurality of the ridge members 128 and other lesser-depth ribs or ridge members to be described herebelow which are provided on all of the other exposed surfaces of the liner 116 act in concert to cushion cargo impact against all exposed surfaces of the cargo bed 114 by absorbing the impact energy through a number of the ridge members and thus distributing the energy over a larger surface area than would have been possible if no ridge members were present.

The ridge members or ribs 118A provided along the liner floor portion 118 extend for substantially the full length thereof, except, of course, where they are interrupted by the presence of the elevated portions 126. Similar ridge members or ribs 124A and 117A are provided on the frontwall portion 124 and tailgate liner 117, respectively. The ribs 117A, 118A and 124A are of a depth which is roughly half the depth of the ridge members 128 provided in the liner sidewall portions 120 and 122 in order to provide ample impact damage protection for the floor, sides and frontwall portion of the bed 114 as well as for the inner wall of the tailgate. Furthermore, it is preferred that the ridge members 126A formed on the front, rear, top, and inner sidewall surfaces of elevated wheel well accommodating portions 126 be of a depth comparable to ribs 117A, 118A and 124A so as to provide similar protection to those portions of the protruding wheel wells which are subject to cargo impact damage.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with recitation of the appended claims.

We claim:

1. A protective liner for a vehicle cargo bed, said protective liner permitting structure positioned in the vehicle cargo bed to be supported and affixed in position in the cargo bed, said liner comprising:

a liner floor portion positionable upon the floor of the vehicle cargo bed, said liner floor portion having elevated portions formed thereupon to conform to wheel wells protruding from the vehicle cargo bed floor;

liner sidewall portions extending upwardly from opposite sides of the liner floor portion, one of each of said liner sidewall portions being positionable against one of a pair of opposite sidewalls of the vehicle cargo bed;

a liner frontwall portion extending upwardly from a front end of the liner floor portion, said liner frontwall portion being positionable against a frontwall of the vehicle cargo bed; and a plurality of spaced apart, vertically extend ridge members protruding in a common plan from the liner sidewall portions for at least a substantially part of the entire height thereof whereby gaps separating adjacent ones of the ridge members of each liner sidewall portion form cooperative opposed load locks of a depth sufficient to receive opposite ends of the structure positioned in the vehicle cargo bed in order to affix the structure against movement in a direction parallel to said liner sidewall portion in the vehicle cargo bed.

2. The liner of claim 1 wherein the load locks formed on the opposite liner sidewall portions are situated to allow a first end of the structure to be anchored in a load lock formed on a first liner sidewall portion, and a second end of the structure to be anchored in a load lock formed on a second liner sidewall portion.

3. The liner of claim 2 wherein said plurality of spaced apart, vertically extending ridge members of each of said liner sidewall portions comprise a plurality of upper load locks and a plurality of lower load locks, and for each liner sidewall portion said plurality of upper load locks are laterally outwardly stepped relative to said plurality of lower load locks.

4. The liner of claim 3 further comprising means for imparting rigidity to said liner sidewall portions and for providing structure support surfaces in the load locks formed between adjacent ones of said plurality upper load locks.

5. The liner of claim 4 wherein said means for imparting rigidity to said liner sidewall portions and for providing structure support surfaces comprise a substantially horizontal surface formed in each said liner sidewall portion and extending substantially the entire length thereof.

6. The liner of claim 5 wherein said substantially horizontal surfaces are situated above upper surfaces of said elevated portions.

7. The liner of claim 3 further comprising means for supporting the structure positioned in the vehicle cargo bed a predetermined distance from said liner floor portion when the structure is received in the load locks formed between adjacent ones of said plurality of lower load locks.

8. The liner of claim 7 wherein said means for supporting the structure positioned in the vehicle cargo bed a predetermined distance from said liner floor portion comprise downwardly and inwardly directed material connecting lower edges of the liner sidewall portions to the liner floor portion.

9. The liner of claim 7 wherein said liner sidewall portions angle inwardly from top to bottom, and said means for supporting the structure positioned in the vehicle cargo bed a predetermined distance from said liner floor portion comprise inner wall surfaces of the load locks formed between adjacent ones of said plurality of lower load locks.

10. The liner of claim 1 further comprising a plurality of spaced apart ribs provided on the liner frontwall portion, the liner floor portion, and on top, side, front and rear surfaces of said elevated portions for cargo impact protection of said vehicle cargo bed.

11. The liner of claim 1 wherein the structure affixed against movement in the vehicle cargo bed includes a storage container.

12. The liner of claim 11 wherein said storage container substantially spans a width of the vehicle cargo bed such that opposite ends of the storage container abut against the upwardly extending liner sidewall portions positioned against opposite sidewall portions of the vehicle cargo bed.

13. The liner of claim 12 wherein the opposite ends of the storage container include means adapted to engage with the liner sidewall portions in an interlocking relationship.

14. The liner of claim 13 wherein said means adapted to engage with the liner sidewall portions includes a plurality of spaced apart, vertically extending ridge members.

15. A system for preventing cargo placed in a vehicle cargo bed from moving therein, said system including, in combination:
at least one cargo elongated structure; and
a protective liner comprising:
a liner floor portion positionable upon a floor of the vehicle cargo bed, said liner floor portion having elevated portions formed thereupon to conform to wheel wells protruding from the vehicle cargo bed floor;
liner sidewall portions extending upwardly from opposite sides of the liner floor portion, one of each of said liner sidewall portions being positionable against one of a pair of opposite sidewalls of the vehicle cargo bed;
a liner frontwall portion extending upwardly from a front end of the liner floor portion, said liner frontwall portion being positionable against a frontwall of the vehicle cargo bed; and
a plurality of spaced apart, vertically extending ridge members protruding from the liner sidewall portions for substantially the entire height thereof whereby gaps separating adjacent ones of the ridge members form load locks of a depth sufficient to receive opposite ends of the at least one elongated structure in order to affix the at least one elongated structure against movement in the vehicle cargo bed,
whereby proper placement and affixation of the at least one elongated structure in said load locks serves to prevent movement of cargo placed in the vehicle cargo bed.

16. The system of claim 15 wherein said plurality of spaced apart, stepped vertically extending ridge members comprise a plurality of upper sections and a plurality of lower sections, and for each respective liner sidewall portion said plurality of upper sections are laterally outwardly stepped relative to said plurality of lower sections, said load locks being formed between adjacent ones of said rigid members.

17. The system of claim 15 further comprising means for affixing cargo placed in said liner against lateral movement in said liner.

18. The system of claim 17 wherein said means for affixing comprise means for securing cargo to said at least one elongated structure.

19. A protective liner for a vehicle cargo bed having a floor wall, endwall and opposed sidewalls, said protective liner protectively covering such bed walls of the cargo bed while supported thereby, said liner comprising:
a liner floor portion positionable upon the floor of the vehicle cargo bed;
liner sidewall portions contiguous with and extending upwardly from opposite sides of the liner floor portion, each of said liner sidewall portions having a height when positioned against a different one of said bed opposed sidewalls of the vehicle cargo bed extending substantially the entire height of the cargo bed sidewalls;
a liner endwall portion contiguous with and extending from an end of the liner floor portion upwardly along said endwall of the vehicle cargo bed; and
a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when transversing said liner floor portion, said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.

20. The liner of claim 19 wherein said plurality of spaced apart vertically extending ridge members for each of said opposed liner sidewall portions comprise a plurality of upper load locks and a plurality of lower load locks.

21. The liner of claim 20 further comprising means for imparting rigidity to said liner sidewall portions and for providing structure support surfaces in the load locks comprised of said plurality of upper load locks.

22. The liner of claim 21 wherein said means for imparting rigidity to said liner sidewall portions and for providing structure support surfaces comprise a substantially horizontal slipped surface formed in each said liner sidewall portion and extending substantially the entire length thereof.

23. The liner of claim 22 wherein said liner floor portion includes elevated portions to conform to wheel wells protruding from said floor wall of said cargo bed, and wherein said substantially horizontal surfaces are situated above said elevated portions.

24. The liner of claim 20 further comprising means for supporting the elongated structure positioned in the vehicle cargo bed a predetermined distance from said liner floor portion when said elongated structure is received in the load locks of said plurality of lower load locks.

25. The liner of claim 24 wherein said means for supporting the structure positioned in the vehicle cargo bed a predetermined distance from said liner floor portion comprise liner sidewall portions.

26. The liner of claim 24 wherein said liner sidewall portions angle inwardly along the height thereof from top to bottom, and said means for supporting said elongated structure in the vehicle cargo bed a predetermined distance from said liner floor portion comprise inner wall surfaces of the load locks formed between adjacent ones of said plurality of lower load locks.

27. The liner of claim 19 wherein said elongated structure affixed against movement in the vehicle cargo bed includes a storage container.

28. The liner of claim 27 wherein said storage container substantially spans a width of the vehicle cargo bed such that opposite ends of the storage container abut against the upwardly extending liner sidewall portions positioned against opposite sidewall portions of the vehicle cargo bed the opposite ends of the storage container include means adapted to engage with said load lock on said liner sidewall portions in an interlocking relationship.

29. The liner of claim 28 wherein said means adapted to engage with the liner sidewall portions includes a plurality of spaced apart and vertically extending ridge members.

30. A protective liner for a vehicle cargo bed having a floor wall, endwall and opposed sidewalls, said protective liner protectively covering at least such endwall and opposed sidewall of cargo bed while supported thereby, said liner comprising:

liner sidewall portions extending upwardly from opposite sides of the bed floor wall, each of said liner sidewall portions having a height when positioned against a different one of said bed opposed sidewalls of the vehicle cargo bed extend substantially the entire height of the cargo bed sidewalls;

a liner endwall portion extending from an end of the liner floor portion upwardly along said endwall of the vehicle cargo bed; and a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when transversing the bed floor said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.

31. The liner of claim 26 wherein said plurality of spaced apart vertically extending ridge members for each of said opposed liner sidewall portions comprise a plurality of upper load locks and a plurality of lower load locks.

32. A protective liner for a cargo bed of a vehicle, said protective liner allowing a structure positioned in the truck cargo bed to be supported and affixed in position in the vehicle cargo bed, including:

a liner floor portion having elevated portions formed thereupon to conform to wheel wells protruding from the cargo bed floor;

upwardly extending liner sidewall portions extending upwardly from opposite sides of the liner floor portion an upwardly extending liner frontwall portion extending upwardly from a front end of the liner floor portion; and means formed on the upwardly extending liner sidewall portions including a plurality of spaced apart, vertically extending ridge members protruding from the liner sidewall portions and forming load locks in gaps separating adjacent ones of the ridge members, said load locks having a depth sufficient to anchor a structure positioned and supported in the cargo bed.

33. The liner of claim 32 wherein said load locks are formed on opposite liner sidewall portions and are situated to allow a first end of said structure to be anchored in a load lock formed on a first liner sidewall portion, and a second end of said structure to be anchored in an opposed load lock formed on a second liner sidewall portion.

34. The liner according to claim 32 wherein said plurality of spaced apart and vertically extending ridge members of each of said liner sidewall portions comprise a plurality of upper sections load locks and a plurality of lower sections load locks, and for each respective liner sidewall portion said plurality of upper sections load locks are laterally outwardly stepped relative to said plurality of lower sections, said load locks being formed between adjacent ones of said plurality of upper sections and adjacent ones of said plurality of lower sections load locks.

35. The protective liner of claim 32 wherein said load locks consist essentially of a plurality of immediately adjacent anchoring sites, each of said sites being bounded on opposite sides thereof by said ridge members.

36. The protective liner of claim 32 wherein more than one of said plurality of ridge members are provided on each of said liner sidewall portions at locations both forwardly and rearwardly of said elevated portions.

37. A protective liner for a cargo bed of a vehicle, said protective liner allowing a structure positioned in the cargo bed including:
- a liner floor portion having elevated portions formed thereupon to conform to wheel wells protruding from the cargo bed floor;
- upwardly extending liner sidewall portions extending upwardly from opposite sides of the liner floor portion;
- an upwardly extending liner frontwall portion extending upwardly from a front end of the liner floor portion; and
- means formed on the upwardly extending liner sidewall portions adapted to engage with the structure positioned in the cargo bed to affix the structure to the liner sidewall portions, supporting the structure thereby,
- wherein the structure supported and affixed in position in the truck cargo bed includes a storage container.

38. The protective liner of claim 37 wherein said storage container spans a width of the truck cargo bed such that opposite ends of the storage container abut against the upwardly extending liner sidewall portions positioned against opposite sidewall portions of the truck cargo bed.

39. The protective liner of claim 38 wherein the opposite ends of the storage container include means adapted to engage with the liner sidewall portions in an interlocking relationship.

40. The protective liner of claim 39 wherein said means adapted to engage with the liner sidewall portions includes a plurality of spaced apart, vertically extending ridge members.

41. The protective liner of claim 37 wherein said storage container further abuts against the upwardly extending liner frontwall portion.

42. The protective liner of claim 41 wherein said upwardly extending liner frontwall portion includes a plurality of spaced apart, vertically extending ridge members.

43. The protective liner of claim 41 wherein said storage container has formed on a front side portion thereof means adapted to engage with the liner frontwall portion in an interlocking relationship.

44. The protective liner of claim 43 wherein said means adapted to engage with the liner frontwall portion includes a plurality of spaced apart, vertically extending ridge members.

* * * * *

(12) REEXAMINATION CERTIFICATE (4524th)
United States Patent
Diaco et al.

(10) Number: US 4,958,876 C1
(45) Certificate Issued: Jan. 29, 2002

(54) VEHICLE CARGO BED LINER

(75) Inventors: Joseph Diaco, Cherry Hill, NJ (US); Todd R. Kennedy, Hanover, PA (US)

(73) Assignee: York Products, Inc., Hanover, PA (US)

Reexamination Request:
No. 90/004,722, Aug. 11, 1997

Reexamination Certificate for:
Patent No.: 4,958,876
Issued: Sep. 25, 1990
Appl. No.: 07/492,904
Filed: Mar. 13, 1990

Related U.S. Application Data

(63) Continuation-in-part of application No. 07/312,571, filed on Feb. 21, 1989, and a continuation-in-part of application No. 07/237,049, filed on Aug. 29, 1988, now abandoned.

(51) Int. Cl.$^7$ .................................................. B60R 13/01
(52) U.S. Cl. ...................................... 296/39.2; 410/144
(58) Field of Search ...................... 296/37.6, 39.1–39.3; D12/98, 221, 406; 224/401–405, 539, 541, 543–544; 410/96, 97, 129, 144, 151, 128, 140, 141, 143; 220/532, 533, 529; 290/10, 12, 15, 180; 280/79.2

(56) References Cited

U.S. PATENT DOCUMENTS

| | | | | |
|---|---|---|---|---|
| 2,274,048 A | * | 2/1942 | Derman | 280/79.2 |
| 2,697,631 A | | 12/1954 | Miller | |
| 2,715,040 A | * | 8/1955 | Rhoads, Sr. | 220/533 X |
| 3,677,562 A | * | 7/1972 | Bronstein | 410/97 |
| 3,680,492 A | | 8/1972 | Weage | |
| 4,181,349 A | * | 1/1980 | Nix et al. | 296/50 X |
| 4,343,578 A | | 8/1982 | Barnes | 410/151 |
| D271,009 S | * | 10/1983 | Fishler | 296/39.2 |
| 4,436,215 A | * | 3/1984 | Kleinert et al. | 220/533 |
| 4,488,669 A | * | 12/1984 | Waters | 296/37.6 X |
| 4,592,583 A | * | 6/1986 | Dresen et al. | 296/39.2 |
| 4,650,383 A | | 3/1987 | Hoff | 410/149 |
| 4,750,776 A | * | 6/1988 | Barbon | 296/39.2 |
| 4,767,149 A | * | 8/1988 | Rye | |
| D298,112 S | * | 10/1988 | Hall | D12/221 |
| 4,887,947 A | * | 12/1989 | Bott | 410/144 |

FOREIGN PATENT DOCUMENTS

| | | | | |
|---|---|---|---|---|
| GB | 135751 | * | 12/1919 | 410/129 |
| JP | 71696 | * | 6/1981 | 410/129 |

OTHER PUBLICATIONS

Commercial Car Journal, Jun. 1979, p. 220, Reversible Liner.

Double–sided document identifying Buddy Plastics Division of Anderson Tank Manufacturing Co. of Flint. Michigan (no date).

* cited by examiner

*Primary Examiner*—Dennis H. Pedder

(57) ABSTRACT

A protective liner for a vehicle cargo bed wherein all surfaces of the liner which may be subject to significant impact from cargo striking thereagainst have formed thereupon a plurality of protective ridge members. Opposite sidewall portions of the liner have starkly protruding, vertically extending ribs of a depth sufficient to form load locks for the ends of elongated structure which is positionable across the width of the liner for preventing fore-and-aft movement of cargo placed in the liner. A storage container having ridge members formed on outer surfaces thereof may also be engaged with the load locks in an interfitting and interlocking relationship, to thereby support and affix the storage container against movement in the vehicle cargo bed.

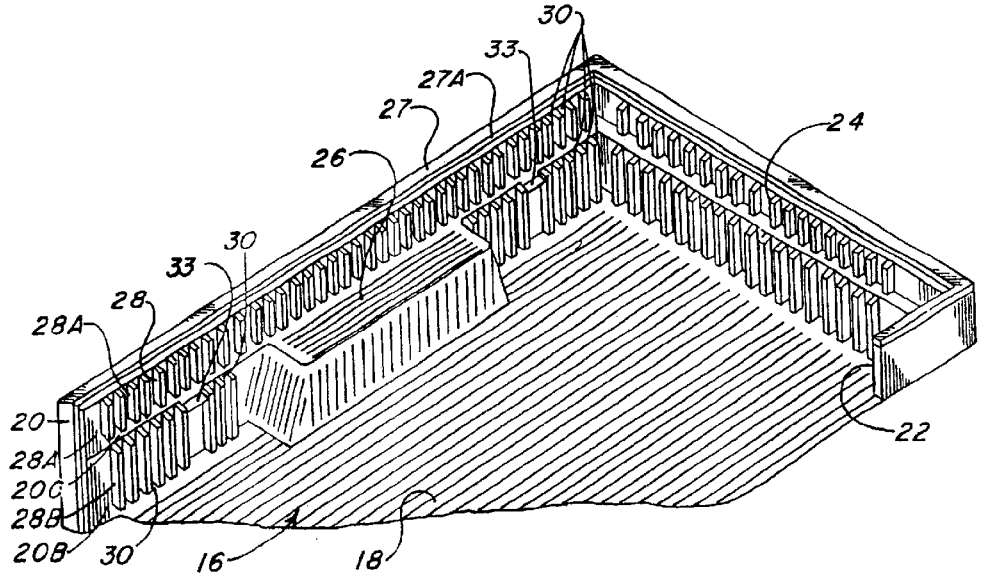

USπ 4,958,876 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 15, 19, 30, 32, 37–44 is confirmed.

Claims 2, 10, 11, 16, 17, 20, 27, 31, 33–36 are determined to be patentable as amended.

Claims 3–9, 12–14, 18, 21–26, 28, 29, dependent on an amended claim, are determined to be patentable.

New claims 45–66 are added and determined to be patentable.

2. The liner of claim 1, *45, 50, 55 or 60* wherein the load locks formed on the opposite liner sidewall portions are situated to allow a first end of the structure to be anchored in a load lock formed on a first liner sidewall portion, and a second end of the structure to be anchored in a load lock formed on a second liner sidewall portion.

10. The liner of claim 1, *45, 50, 55 or 60* further comprising a plurality of spaced apart ribs provided on the liner frontwall portion, the liner floor portion, and on top, side, front and rear surfaces of said elevated portions for cargo impact protection of said vehicle cargo bed.

11. The liner of claim 1, *45, 50, 55 or 60* wherein the structure affixed against movement in the vehicle cargo bed includes a storage container.

16. The system of claim 15, *46, 51, 56 or 61* wherein said plurality of spaced apart, stepped vertically extending ridge members comprise a plurality of upper sections and a plurality of lower sections, and for each respective liner sidewall portion said plurality of upper sections are laterally outwardly stepped relative to said plurality of lower sections, said load locks being formed between adjacent ones of said ridge members.

17. The system of claim 15, *46, 51, 56 or 61* further comprising means for affixing cargo placed in said liner against lateral movement in said liner.

20. The liner of claim 19, *47, 52, 57 or 62* wherein said plurality of spaced apart vertically extending ridge members for each of said opposed liner sidewall portions comprise a plurality of upper load locks and a plurality of lower load locks.

27. The liner of claim 19, *47, 52, 57 or 62* wherein said elongated structure affixed against movement in the vehicle cargo bed includes a storage container.

31. The liner of claim [26,] *48, 53, 58 or 63* wherein said plurality of spaced apart vertically extending ridge members for each of said opposed liner sidewall portions comprise a plurality of upper load locks and a plurality of lower load locks.

33. The liner of claim 32, *49, 54, 59 or 64* wherein said load locks are formed on opposite liner sidewall portions and are situated to allow a first end of said structure to be anchored in a load lock formed on a first liner sidewall portion, and a second end of said structure to be anchored in an opposed load lock formed on a second liner sidewall portion.

34. The liner according to claim 32, *49, 54, 59 or 64* wherein said plurality of spaced apart and vertically extending ridge members of each of said liner sidewall portions comprise a plurality of upper sections load locks and a plurality of lower sections load locks, and for each respective liner sidewall portion said plurality of upper sections load locks are laterally outwardly stepped relative to said plurality of lower sections, said load locks being formed between adjacent ones of said plurality of upper sections and adjacent ones of said plurality of lower sections load locks.

35. The protective liner of claim 32, *49, 54, 59 or 64* wherein said load locks consist essentially of a plurality of immediately adjacent anchoring sites, each of said sites being bounded on opposite sides thereof by said ridge members.

36. The protective liner of claim 32, *49, 54, 59 and 64* wherein more than one of said plurality of ridge members are provided on each of said liner sidewall portions at locations both forwardly and rearwardly of said elevated portions.

*45. A protective liner for a vehicle cargo bed, said protective liner permitting structure positioned in the vehicle cargo bed to be supported and affixed in position in the cargo bed, said liner comprising:*

*a liner floor portion positionable upon the floor of the vehicle cargo bed, said liner floor portion having elevated portions formed thereupon to conform to wheel wells protruding from the vehicle cargo bed floor;*

*generally parallel liner sidewall portions extending upwardly from opposite sides of the liner floor portion, one of each of said liner sidewall portions being positionable against one of a pair of opposite sidewalls of the vehicle cargo bed;*

*a liner frontwall portion extending upwardly from a front end of the liner floor portion, said liner frontwall portion being positionable against a frontwall of the vehicle cargo bed; and*

*a plurality of spaced apart, vertically extending ridge members protruding in a common plane from the liner sidewall portions for at least a substantial part of the entire height thereof whereby gaps separating adjacent ones of the ridge members of each liner sidewall portion form cooperative opposed load locks of a depth sufficient to receive opposite ends of the structure positioned in the vehicle cargo bed in order to affix the structure against movement in a direction parallel to said liner sidewall portion in the vehicle cargo bed.*

*46. A system for preventing cargo placed in a vehicle cargo bed from moving therein, said system including, in combination:*

*at least one cargo elongated structure; and*

*a protective liner comprising:*

*a liner floor portion positionable upon a floor of the vehicle cargo bed, said liner floor portion having elevated portions formed thereupon to conform to wheel wells protruding from the vehicle cargo bed floor;*

*generally parallel liner sidewall portions extending upwardly from opposite sides of the liner floor portion, one of each of said liner sidewall portions being positionable against one of a pair of opposite sidewalls of the vehicle cargo bed;* a liner frontwall portion extending upwardly from a front end of the liner floor portion, said liner frontwall portion being positionable against a frontwall of the vehicle cargo bed; and a plurality of spaced apart, vertically extending ridge members protruding from the liner sidewall portions for substantially the entire height thereof whereby gaps separating adjacent ones of the ridge members form load locks of a depth sufficient to receive opposite ends of the at least one elongated structure in order to affix the at least one elongated structure against movement in the vehicle cargo bed, whereby proper placement and affixation of the at least one elongated structure in said load locks serves to prevent movement of cargo placed in the vehicle cargo bed.

47. *A protective liner for a vehicle cargo bed having a floor wall, endwall and opposed sidewalls, said protective liner protectively covering such bed walls of the cargo bed while supported thereby, said liner comprising:*

*a liner floor portion positionable upon the floor of the vehicle cargo bed;*

*generally parallel liner sidewal portions contiguous with and extending upwardly from opposite sides of the liner floor portion, each of said liner sidewall portions having a height when positioned against a different one of said bed opposed sidewalls of the vehicle cargo bed to extend substantially the entire height of the cargo bed sidewalls;*

*a liner endwall portion contiguous with and extending from an end of the liner floor portion upwardly along said endwall of the vehicle cargo bed; and*

*a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when traversing said liner floor portion, said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.*

48. *A protective liner for a vehicle cargo bed having a floor wall, endwall and opposed sidewalls, said protective liner protectively covering at least such endwall and opposed sidewall of cargo bed while supported thereby, said liner comprising:*

*generally parallel liner sidewall portions extending upwardly from opposite sides of the bed floor wall, each of said liner sidewall portions having a height when positioned against a different one of said bed opposed sidewalls of the vehicle cargo bed to extend substantially the entire height of the cargo bed sidewalls;*

*a liner endwall portion extending from an end of the liner floor portions upwardly along said endwall of the vehicle cargo bed; and*

*a plurality of spaced apart ridge members protruding from the liner sidewall portions for substantially the entire height thereof and at spaced apart intervals such that gaps separating adjacent ones of the ridge mem-bers form load locks situated on both of said opposed liner sidewall portions, said load locks being situated in an opposing cooperative relation so as to receive end portions of an elongated structure when transversing the bed floor said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.*

49. *A protective liner for a cargo bed of a vehicle, said protective liner allowing a structure positoned in the truck cargo bed to be supported and affixed in position in the vehicle cargo bed, including:*

*a liner floor portion having elevated portions formed thereupon to conform to wheel wells protruding from the cargo bed floor;*

*generally parallel upwardly extending liner sidewall por-tions extending upwardly from opposite sides of the liner floor portion;*

*an upwardly extending liner frontwall portion extending upwardly from a front end of the liner floor portion; and*

*means formed on the upwardly extending liner sidewall portions including a plurality of spaced apart, verti-cally extending ridge members protruding from the liner sidewall portions and forming load locks in gaps separating adjacent ones of the ridge members, said load locks having a depth sufficient to anchor a struc-ture positioned and supported in the cargo bed.*

50. *A protective liner for a vehicle cargo bed, said protective liner permitting structure positioned in the vehicle cargo bed to be supported and affixed in position in the cargo bed, said liner comprising:*

*a liner floor portion positionable upon the floor of the vehicle cargo bed, said liner floor portion having elevated portions formed thereupon to conform to wheel wells protruding from the vehicle cargo bed floor;*

*liner sidewall portions extending upwardly at an angle of about 2.5 degrees from the vertical from opposite sides of the liner floor portion, one of each of said liner sidewall portions being positionable against one of a pair of opposite sidewalls of the vehicle cargo bed;*

*a liner frontwall portion extending upwardly from a front end of the liner floor portion, said liner frontwall portion being positionable against a frontwall of the vehicle cargo bed; and*

*a plurality of spaced apart, vertically extending ridge members protruding in a common plane from the liner sidewall portions for at least a substantial part of the entire height thereof whereby gaps separating adjacent ones of the ridge members of each liner sidewall portion from cooperative opposed load locks of a depth sufficient to receive opposite ends of the structure positioned in the vehicle cargo bed in order to affix the structure against movement in a direction parallel to said liner sidewall portion in the vehicle cargo bed.*

51. *A system for preventing cargo placed in a vehicle cargo bed from moving therein, said system including, in combination:*

*at least one cargo elongated structure; and*

*a protective liner comprising:*

*a liner floor portion positionable upon a floor of the vehicle cargo bed, said liner floor portion having* elevated portions formed thereupon to conform to wheel wells protruding from the vehicle cargo bed floor;

liner sidewall portions extending upwardly at an angle of about 2.5 degrees from the vertical from opposite sides of the liner floor portion, one of each of said liner sidewall portions being positionable against one of a pair of opposite sidewalls of the vehicle cargo bed;

a liner frontwall portion extending upwardly from a front end of the liner floor portion, said liner frontwall portion being positionable against a frontwall of the vehicle cargo bed; and a plurality of spaced apart, vertically extending ridge members protruding from the liner sidewall portions for substantially the entire height thereof whereby gaps separating adjacent ones of the ridge members form load locks of a depth sufficient to receive opposite ends of the at least one elongated structure in order to affix the at least one elongated structure against movement in the vehicle cargo bed, whereby proper placement and affixation of the at least one elongated structure in said load locks serves to prevent movement of cargo placed in the vehicle cargo bed.

52. A protective liner for a vehicle cargo bed having a floor wall, endwall and opposed sidewalls, said protective liner protectively covering such bed walls of the cargo bed while supported thereby, said liner comprising:

a liner floor portion positionable upon the floor of the vehicle cargo bed;

liner sidewall portions contiguous with and extending upwardly at an angle of about 2.5 degrees from the vertical from opposite sides of the liner floor portion, each of said liner sidewall portions having a height when positioned against a different one of said bed opposed sidewalls of the vehicle cargo bed to extend substantially the entire height of the cargo bed sidewalls;

a liner endwall portion contiguous with and extending from an end of the liner floor portion upwardly along said endwall of the vehicle cargo bed; and a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when traversing said liner floor portion, said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.

53. A protective liner for a vehicle cargo bed having a floor wall, endwall and opposed sidewalls, said protective liner protectively covering at least such endwall and opposed sidewall of cargo bed while supported thereby, said liner comprising:

liner sidewall portions extending upwardly at an angle of about 2.5 degrees from the vertical from opposite sides of the bed floor wall, each of said liner sidewall portions having a height when positioned against a different one of said bed opposed sidewalls of the vehicle cargo bed to extend substantially the entire height of the cargo bed sidewalls, said liner floor portion including ribs to provide impact damage protection for the vehicle cargo bed floor;

a liner endwall portion extending from an end of the liner floor portion upwardly along said endwall of the vehicle cargo bed; and a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when transversing the bed floor said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.

54. A protective liner for a cargo bed of a vehicle, said protective liner allowing a structure positioned in the truck cargo bed to be supported and affixed in position in the vehicle cargo bed, including:

a liner floor portion having elevated portions formed thereupon to conform to wheel wells protruding from the cargo bed floor;

upwardly extending liner sidewall portions extending upwardly at an angle of about 2.5 degrees from the vertical from opposite sides of the liner floor portion;

an upwardly extending liner frontwall portion extending upwardly from a front end of the liner floor portion; and means formed on the upwardly extending liner sidewall portions including a plurality of spaced apart, vertically extending ridge members protruding from the liner sidewall portions and forming load locks in gaps separating adjacent ones of the ridge members, said load locks having a depth sufficient to anchor a structure positioned and supported in the cargo bed.

55. A protective liner for a vehicle cargo bed, said protective liner permitting structure positioned in the vehicle cargo bed to be supported and affixed in position in the cargo bed, said liner comprising:

a liner floor portion positionable upon the floor of the vehicle cargo bed, said liner floor portion having elevated portions formed thereupon to conform to wheel wells protruding from the vehicle cargo bed floor, said liner floor portion including ribs to provide impact damage protection for the vehicle cargo bed floor;

liner sidewall portions extending upwardly from opposite sides of the liner floor portion, one of each of said liner sidewall portions being positionable against one of a pair of opposite sidewalls of the vehicle cargo bed;

a liner frontwall portion extending upwardly from a front end of the liner floor portion, said liner frontwall portion being positionable against a frontwall of the vehicle cargo bed; and a plurality of spaced apart, vertically extending ridge members protruding in a common plane from the liner sidewall portions for at least a substantial part of the entire height thereof whereby gaps separating adjacent ones of the ridge members of each liner sidewall portion form cooperative opposed load locks of a depth sufficient to receive opposite ends of the structure positioned in the vehicle cargo bed in order to affix the structure against movement in a direction parallel to said liner sidewall portion in the vehicle cargo bed, the ridge members being approximately twice the depth of said ribs in the liner floor portion.

56. A system for preventing cargo placed in a vehicle cargo bed from moving therein, said system including, in combination:

at least one cargo elongated structure; and a protective liner comprising:

a liner floor portion positionable upon a floor of the vehicle cargo bed, said liner floor portion having elevated portions formed thereupon to conform to wheel wells protruding from the vehicle cargo bed floor, said liner floor portion including ribs to provide impact damage protection for the vehicle cargo bed floor;

liner sidewall portions extending upwardly from opposite sides of the liner floor portion, one of each of said liner sidewall portions being positionable against one of a pair of opposite sidewalls of the vehicle cargo bed;

a liner frontwall portion extending upwardly from a front end of the liner floor portion, said liner frontwall portion being positionable against a frontwall of the vehicle cargo bed; and a plurality of spaced apart, vertically extending ridge members protruding from the liner sidewall portions for substantially the entire height thereof whereby gaps separating adjacent ones of the ridge members form load locks of a depth sufficient to receive opposite ends of the at least one elongated structure in order to affix the at least one elongated structure against movement in the vehicle cargo bed, the ridge members being approximately twice the depth of said ribs in the liner floor portion, whereby proper placement and affixation of the at least one elongated structure in said load locks serves to prevent movement of cargo placed in the vehicle cargo bed.

57. A protective liner for a vehicle cargo bed having a floor wall, endwall and opposed sidewalls, said protective liner protectively covering such bed walls of the cargo bed while supported thereby, said liner comprising:

a liner floor portion positionable upon the floor of the vehicle cargo bed, said liner floor portion including ribs to provide impact damage protection for the vehicle cargo bed floor;

liner sidewall portions contiguous with and extending upwardly from opposite sides of the liner floor portion, each of said liner sidewall portions having a height when positioned against a different one of said bed opposed sidewalls of the vehicle cargo bed to extend substantially the entire height of the cargo bed sidewalls;

a liner endwall portion contiguous with and extending from an end of the liner floor portion upwardly along said endwall of the vehicle cargo bed; and a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when traversing said liner floor portion, said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed, the ridge members being approximately twice the depth of said ribs in the liner floor portion.

58. A protective liner for a vehicle cargo bed having a floor wall, endwall and opposed sidewalls, said protective liner protectively covering at least such endwall and opposed sidewall of cargo bed while supported thereby, said liner comprising:

liner sidewall portions extending upwardly from opposite sides of a liner floor wall portion, said liner floor portion including ribs to provide impact damage protection for the vehicle cargo bed floor, each of said liner sidewall portions having a height when positioned against a different one of said bed opposed sidewalls of the vehicle cargo bed to extend substantially the entire height of the cargo bed sidewalls;

a liner endwall portion extending from an end of the liner floor portion upwardly along said endwall of the vehicle cargo bed; and a plurality of spaced apart ridge members protruding from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when transversing the bed floor said ridge members having sufficient strength and depth to provide load bearing surfaces engagable with opposed surfaces of the received end portions of said elongated structure when positioned in opposing load locks of the liner sidewalls in order to afffix and support said elongated structure against movement toward and away from said liner endwall portion of the vehicle cargo bed, the ridge members being approximately twice the depth of said ribs in the liner floor portion.

59. A protective liner for a cargo bed of a vehicle, said protective liner allowing a structure positioned in the truck cargo bed to be supported and affixed in position in the vehicle cargo bed, including:

a liner floor portion having elevated portions formed thereupon to conform to wheel wells protruding from the cargo bed floor, said liner floor portion including ribs to provide impact damage protection for the vehicle cargo bed floor;

upwardly extending liner sidewall portions extending upwardly from opposite sides of the liner floor portion;

an upwardly extending liner frontwall portion extending upwardly from a front end of the liner floor portion; and means formed on the upwardly extending liner sidewall portions including a plurality of spaced apart, vertically extending ridge members protruding from the liner sidewall portions and forming load locks in gaps separating adjacent ones of the ridge members, said load locks having a depth sufficient to anchor a structure positioned and supported in the cargo bed, the ridge members being approximately twice the depth of said ribs in the liner floor portion.

60. A protective liner for a vehicle cargo bed, said protective liner permitting structure positioned in the vehicle cargo bed to be supported and affixed in position in the cargo bed, said liner comprising:

a liner floor portion positionable upon the floor of the vehicle cargo bed, said liner floor portion having elevated portions formed thereupon to conform to wheel wells protruding from the vehicle cargo bed floor;

liner sidewall portions extending upwardly from opposite sides of the liner floor portion, one of each of said liner sidewall portions being positionable against one of a pair of opposite sidewalls of the vehicle cargo bed;

a liner frontwall portion extending upwardly from a front end of the liner floor portion, said liner frontwall portion being positionable against a frontwall of the vehicle cargo bed; and a plurality of spaced apart, vertically extending ridge members protruding with a gradually increasing width from top to bottom thereof in a common plane from the liner sidewall portions for at least a substantial part of the entire height thereof whereby gaps separating adjacent ones of the ridge members of each liner sidewall portion form cooperative opposed load locks of a depth sufficient to receive opposite ends of the structure positioned in the vehicle cargo bed in order to affix the structure against movement in a direction parallel to said liner sidewall portion in the vehicle cargo bed.

61. A system for preventing cargo placed in a vehicle cargo bed from moving therein, said system including, in combination:

at least one cargo elongated structure; and a protective liner comprising:

a liner floor portion positionable upon a floor of the vehicle cargo bed, said liner floor portion having elevated portions formed thereupon to conform to wheel wells protruding from the vehicle cargo bed floor;

liner sidewall portions extending upwardly from opposite sides of the liner floor portion, one of each of said liner sidewall portions being positionable against one of a pair of opposite sidewalls of the vehicle cargo bed;

a liner frontwall portion extending upwardly from a front end of the liner floor portion, said liner frontwall portion being positionable against a frontwall of the vehicle cargo bed; and a plurality of spaced apart, vertically extending ridge members protruding with a gradually increasing width from top to bottom thereof from the liner sidewall portions for substantially the entire height thereof whereby gaps separating adjacent ones of the ridge members form load locks of a depth sufficient to receive opposite ends of the at least one elongated structure in order to affix the at least one elongated structure against movement in the vehicle cargo bed.

whereby proper placement and affixation of the at least one elongated structure in said load locks serves to prevent movement of cargo placed in the vehicle cargo bed.

62. A protective liner for a vehicle cargo bed having a floor wall, endwall and opposed sidewalls, said protective liner protectively covering such bed walls of the cargo bed while supported thereby, said liner comprising:

a liner floor portion positionable upon the floor of the vehicle cargo bed;

liner sidewall portions contiguous with and extending upwardly from opposite sides of the liner floor portion, each of said liner sidewall portions having a height when positioned against a different one of said bed opposed sidewalls of the vehicle cargo bed to extend substantially the entire height of the cargo bed sidewalls;

a liner endwall portion contiguous with and extending from an end of the liner floor portion upwardly along said endwall of the vehicle cargo bed; and a plurality of spaced apart ridge members protruding with a gradually increasing width from top to bottom thereof from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when traversing said liner floor portion, said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.

63. A protective liner for a vehicle cargo bed having a floor wall, endwall and opposed sidewalls, said protective liner protectively covering at least such endwall and opposed sidewall of cargo bed while supported thereby, said liner comprising:

liner sidewall portions extending upwardly from opposite sides of the bed floor wall, each of said liner sidewall portions having a height when positioned against a different one of said bed opposed sidewalls of the vehicle cargo bed to extend substantially the entire height of the cargo bed sidewalls;

a liner endwall portion extending from an end of the liner floor portions upwardly along said endwall of the vehicle cargo bed; and a plurality of spaced apart ridge members protruding with a gradually increasing width from top to bottom thereof from the liner sidewall portions for substantially the entire height thereof and at spaced apart intervals such that gaps separating adjacent ones of the ridge members form load locks situated on both of said opposed liner sidewall portions, said load locks being situated in an opposing cooperative relation so as to receive end portions of an elongated structure when transversing the bed floor said ridge members having sufficient strength and depth to provide load bearing surfaces engagable with opposed surfaces of the received end portions of said elongated structure when positioned in opposing load locks of the liner sidewalls in order to affix and support said elongated structure against movement toward and away from said liner endwall portion of the vehicle cargo bed.

64. A protective liner for a cargo bed of a vehicle, said protective liner allowing a structure positioned in the truck cargo bed to be supported and affixed in position in the vehicle cargo bed, including;

a liner floor portion having elevated portions formed thereupon to conform to wheel wells protruding from the cargo bed floor;

upwardly extending liner sidewall portions extending upwardly from opposite sides of the liner floor portion;

an upwardly extending liner frontwall portion extending upwardly from a front end of the liner floor portion; and means formed on the upwardly extending liner sidewall portions including a plurality of spaced apart, vertically extending ridge members protruding with a gradually increasing width from top to bottom thereof from the liner sidewall portions and forming load locks in gaps separating adjacent ones of the ridge members, said load locks having a depth sufficient to anchor a structure positioned and supported in the cargo bed.

65. The liner of claim 4 wherein said means for imparting rigidity to said liner sidewall portions and for providing structure support surfaces comprise a substantially horizontal surface formed in each said liner sidewall portions to support the bottom end of structure anchored between opposed ridge members.

66. A protective liner for a cargo bed of a vehicle, said protective liner allowing a structure positioned in the truck cargo bed to be supported and affixed in position in the vehicle cargo bed, including;

a liner floor portion having elevated portions formed thereupon to conform to wheel wells protruding from the cargo bed floor;

upwardly extending liner sidewall portions extending upwardly from opposite sides of the liner floor portion;

an upwardly extending liner frontwall portion extending upwardly from a front end of the liner floor portion; and means formed on the upwardly extending liner sidewall portions including a plurality of spaced apart, vertically extending ridge members protruding from the liner sidewall portions forming load locks in gaps separating adjacent ones of the ridge members, each of said load locks being defined by a notch formed as a gap between two vertically extending ridge members and containing a horizontal surface, said load locks having a depth sufficient to anchor a structure positioned and supported in the cargo bed.

\* \* \* \* \*